(12) United States Patent
Ogata

(10) Patent No.: US 10,086,439 B2
(45) Date of Patent: Oct. 2, 2018

(54) BORING TOOL

(71) Applicant: Daishowa Seiki Kabushiki Kaisha, Osaka (JP)

(72) Inventor: Tatsuya Ogata, Osaka (JP)

(73) Assignee: Daishowa Seiki Kabushiki Kaisha, Osaka (JP)

( * ) Notice: Subject to any disclaimer, the term of this patent is extended or adjusted under 35 U.S.C. 154(b) by 0 days.

(21) Appl. No.: 15/306,920

(22) PCT Filed: May 8, 2014

(86) PCT No.: PCT/JP2014/062401
§ 371 (c)(1),
(2) Date: Oct. 26, 2016

(87) PCT Pub. No.: WO2015/170390
PCT Pub. Date: Nov. 12, 2015

(65) Prior Publication Data
US 2017/0043407 A1     Feb. 16, 2017

(51) Int. Cl.
*B23B 29/034* (2006.01)
*B23Q 11/10* (2006.01)
(Continued)

(52) U.S. Cl.
CPC ........ *B23B 29/03403* (2013.01); *B23B 27/10* (2013.01); *B23B 29/0341* (2013.01);
(Continued)

(58) Field of Classification Search
CPC ........ B23B 29/03403; B23B 29/03407; B23B 29/0341; B23B 29/12; B23Q 11/10
See application file for complete search history.

(56) References Cited

U.S. PATENT DOCUMENTS 3,037,264 A * 6/1962 Mossberg ................. B23C 5/10
407/11
3,625,624 A * 12/1971 Fitzsimmons .... B23B 29/03403
407/37

(Continued)

FOREIGN PATENT DOCUMENTS

CH         672605 A5    12/1989
CN       101249613 A     8/2008
(Continued)

OTHER PUBLICATIONS

Machine translation, Japan patent document, JP2008-221400A, inventor, Nakajima et al., Sep. 25, 2008.*
(Continued)

*Primary Examiner* — Daniel Howell
*Assistant Examiner* — Chwen-Wei Su
(74) *Attorney, Agent, or Firm* — Dilworth & Barrese, LLP

(57) ABSTRACT

Provided is a boring tool capable of suppressing wear of a cutting blade according to a shape of a bore to be formed in a workpiece. The tool includes a tool body to be attached to a spindle of a rotary machining tool, and a plurality of cartridges each attached to a leading end face of the tool body, having a cutting blade and being position-adjustable in a radial direction. The tool body has a coolant passage for transporting coolant along a rotational axis direction. A discharge hole for the coolant is comprised of a first discharge hole provided between the plurality of cartridges in a leading end face and a second discharge hole provided in an outer circumference of the tool body and directed toward the cutting edge of the cutting blade.

13 Claims, 4 Drawing Sheets

(51) Int. Cl.
B23B 29/12 (2006.01)
B23B 27/10 (2006.01)

(52) U.S. Cl.
CPC .......... B23B 29/12 (2013.01); *B23B 2220/24* (2013.01); *B23B 2220/44* (2013.01); *B23B 2250/12* (2013.01); *B23Q 11/10* (2013.01)

(56) References Cited

U.S. PATENT DOCUMENTS

| | | | | |
|---|---|---|---|---|
| 3,782,849 | A * | 1/1974 | Mizoguchi | B23B 29/03425 |
| | | | | 408/146 |
| 3,795,454 | A * | 3/1974 | Elchyshyn | B23B 29/03403 |
| | | | | 407/104 |
| 4,043,697 | A * | 8/1977 | Eckle | B23B 29/03407 |
| | | | | 407/37 |
| 4,168,925 | A | 9/1979 | Dufresne | |
| 4,464,088 | A | 8/1984 | Dehn | |
| 4,500,233 | A | 2/1985 | Dehn | |
| 5,330,297 | A * | 7/1994 | Engstrand | B23B 29/03407 |
| | | | | 408/153 |
| 6,254,319 | B1 * | 7/2001 | Maier | B23C 5/2444 |
| | | | | 407/45 |
| 6,524,034 | B2 * | 2/2003 | Eng | B23B 51/00 |
| | | | | 408/144 |
| 2013/0202376 | A1 | 8/2013 | Meyer et al. | |

FOREIGN PATENT DOCUMENTS

| | | | | |
|---|---|---|---|---|
| DE | 8526482 | U1 | 11/1985 | |
| DE | 3622638 | A1 | 3/1987 | |
| DE | 4224772 | A1 | 2/1994 | |
| DE | 19944851 | A1 | 6/2001 | |
| DE | 102004044267 | A1 * | 3/2006 | ............. B23B 31/20 |
| DE | 202013104099 | U1 * | 9/2013 | ......... B23Q 11/0032 |
| JP | 5-96444 | A | 4/1993 | |
| JP | 8-25111 | A | 1/1996 | |
| JP | 10-166219 | A | 6/1998 | |
| JP | 2008-200801 | A | 9/2008 | |
| JP | 2008-221400 | A | 9/2008 | |
| JP | 2010076088 | A * | 4/2010 | ............. B23C 5/28 |
| SU | 1685618 | A2 * | 10/1991 | |
| WO | WO 9855254 | A1 * | 12/1998 | ............. B23B 27/10 |

OTHER PUBLICATIONS

English Translation of International Preliminary Report on Patentability dated Nov. 17, 2016 (Forms PCT/IB/338, PCT/IB/373 & PCT/ISA/237).
European Search Report dated Nov. 24, 2017.
Chinese Office Action dated Jan. 30, 2018 with English Translation.

* cited by examiner

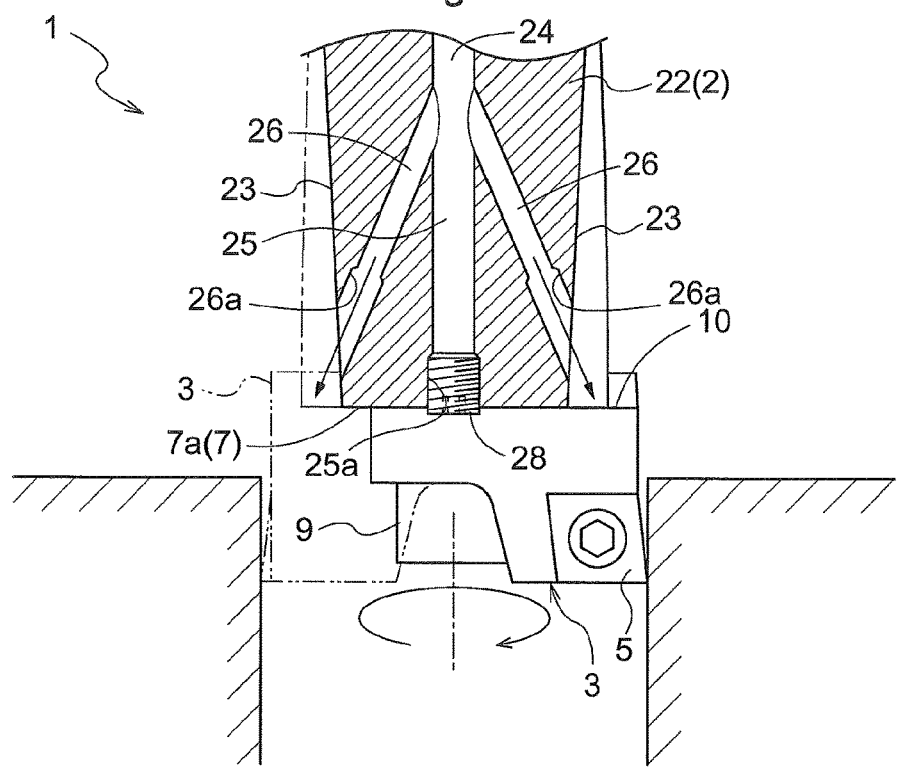
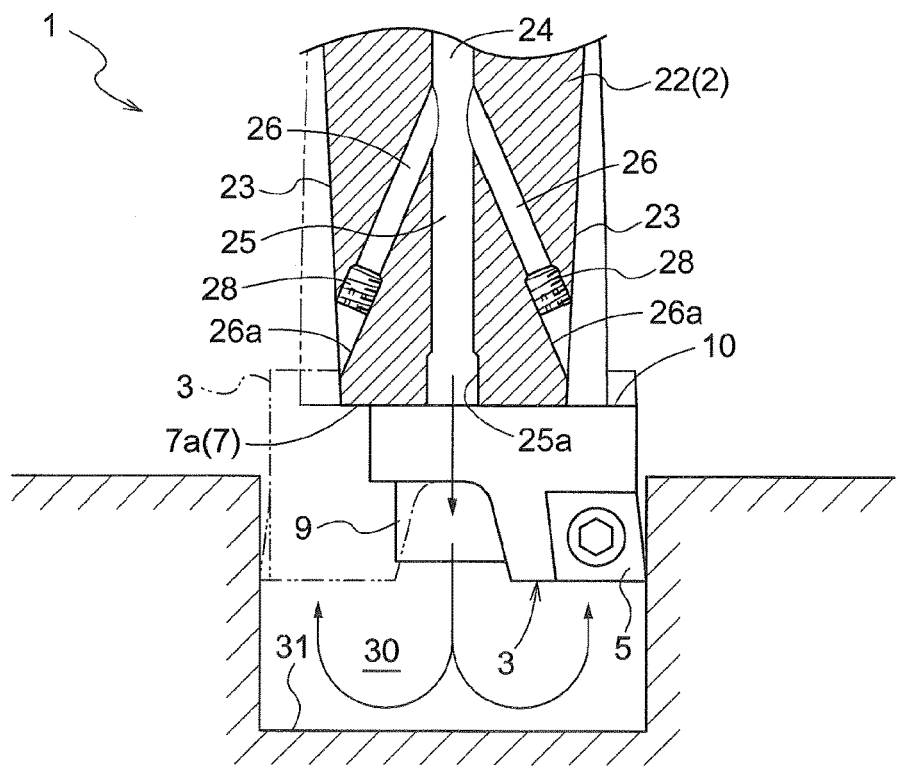

BORING TOOL

TECHNICAL FIELD

The present invention relates to a boring tool for machining an inner face.

BACKGROUND ART

The boring tool for machining an inner face is for use in rough machining or precision finishing of an inner face of a bore formed in a workpiece. Patent Document 1 discloses a boring tool (a boring head) having two cutting blades arranged with an offset of 180 degrees approximately relative to a tool body (a pedestal).

At time of inner face machining by the boring tool, heat is generated in the cutting blade due to friction with or heat conduction from the workpiece, which can lead to entrapment of cutting chips by the cutting blade, thus inviting wear of the cutting blade. In the boring tool disclosed in Patent Document 1, a cartridge (a tool mount member) having the cutting blade is provided with a jet orifice for jetting coolant toward the cutting blade. With this arrangement, chips and/or the cutting blade are cooled by the coolant and adhesion of the chips to the cutting blade is prevented, so that wear of the cutting blade is suppressed.

CITATION LIST

Patent Literature

Patent Document 1: JP 2008-221400A

SUMMARY OF INVENTION

Technical Problem

When an inner face machining is to be effected for a blind hole, chips generated under the cutting blade need to be discharged to the outside via a gap between an outer circumference of the tool body and the blind hole. However, when coolant is jetted toward the cutting blade with using the boring tool disclosed in Patent Document 1, the coolant can sometimes block flow of chips to be discharged. If this happens, the chips will be accumulated at the hole bottom, which may cause chip clogging or entrapment of chips by the cutting blade. In particular, in the case of machining a small-diameter hole having only limited chip discharging space, such inconvenience as above will appear more conspicuously.

The present invention has been made in view of the above-described state of the art. The object thereof is to provide a boring tool allowing machining of bores with a variety of shapes with effective suppression of wear of the cutting blade.

Solution to Problem

According to a characterizing feature of a boring tool relating to the present invention, the boring tool comprises:
a tool body to be attached to a spindle of a rotary machining tool; and
a plurality of cartridges each attached to a leading end face of the tool body, having a cutting blade and being position-adjustable in a radial direction;
wherein the tool body has a coolant passage for transporting coolant along a rotational axis direction; and
a discharge hole for the coolant is comprised of a first discharge hole provided between the plurality of cartridges in the leading end face and a second discharge hole provided in an outer circumference of the tool body and directed toward a cutting edge of the cutting blade.

In the above-described arrangement, the discharge hole for coolant is comprises of a first discharge hole provided in the leading end face of the tool body and a second discharge hole provided in the outer circumference of the tool body. With this arrangement, the first discharge hole is capable of discharging the coolant toward the hole bottom of the workpiece at the time of inner face machining of a blind hole. This coolant discharged from the first discharge hole will form a flow which is reflected at/by the hole bottom to then rise along the inner wall of the hole toward the opening. With this, chips will be discharged from the circumference of the tool body without being accumulated at the hole bottom.

On the other hand, in case of inner face machining of a through hole, the coolant discharged from the second discharge hole toward the cutting edge will cool the cutting edge, thus effectively preventing adhesion of chips to this cutting edge.

Thus, with the boring tool having the above-described arrangement, it is possible to effect feeding of the coolant in the rotational axis direction of the tool body by the first discharge hole and also feeding of the coolant to the cutting edge by the second discharge hole. Namely, the coolant can be fed toward the bore from both the first discharge hole and the second discharge hole. Consequently, both the chip discharging effect and the cutting edge cooling effect can be enhanced for effective suppression of cutting edge wear.

According to a further characterizing feature of the present invention, the first discharge hole and the second discharge hole are provided respectively with an adjusting mechanism for adjusting a respective coolant discharge amount of the first discharge hole and the second discharge hole.

For realizing adjustment of coolant discharge amount from the first discharge opening and the second discharge opening respectively, it will be conceivable to e.g. vary a feeding amount of the coolant at the feeding source thereof. In this case, however, in order to allow adjustment of the coolant discharge amount from the first discharge hole and the coolant discharge amount from the second discharge hole discretely from each other, it is necessary to provide a coolant passage communicated to the first discharge hole and a further coolant passage communicated to the second discharge hole separately. Thus, this requires separate machining operations to be effected on the inside of the tool body.

In contrast, with the above-described inventive arrangement, the first discharge hole and the second discharge hole are provided respectively with an adjusting mechanism for adjusting a respective coolant discharge amount thereof. With this, the interior machining of the tool body can be minimized. And, with such simple arrangement, it is readily possible to adjust the coolant discharge amounts from the first discharge hole and the second discharge hole, according to a machining condition of the bore. As a result, such adjustment for increasing the coolant discharge amount from the first discharge hole with priority being placed on chips discharge or for increasing the coolant discharge from the second discharge hole with priority being placed on cutting edge cooling.

According to a still further characterizing feature of the present invention, at least one of the plurality of cartridges includes a communication portion for communicating the coolant discharged from the first discharge hole, irrespective of an adjustable position of the cartridge.

The cartridge will be position-adjusted in a radial direction in the leading end face of the tool body in accordance with a diameter subjected to inner face machining. For this reason, it can sometimes happen that such position-adjusted cartridge may present obstacle in the feeding direction of the coolant discharged from the first discharge hole. On the other hand, with the inventive arrangement described above, a cartridge is provided with a communication portion for communicating the coolant discharged from the first discharge hole, irrespective of an adjustable position of this cartridge. Thus, through this communication portion, the coolant can be fed in a reliable manner to the bore of the workpiece.

BRIEF DESCRIPTION OF DRAWINGS

FIG. 7 is a partial section of the boring tool engaged in an inner face machining to a through hole, and FIG. 8 is a partial section of a boring tool engaged in an inner face machining of a blind hole.

DESCRIPTION OF EMBODIMENTS

Next, an embodiment of the present invention will be explained with reference to the accompanying drawings.

Figure 1:
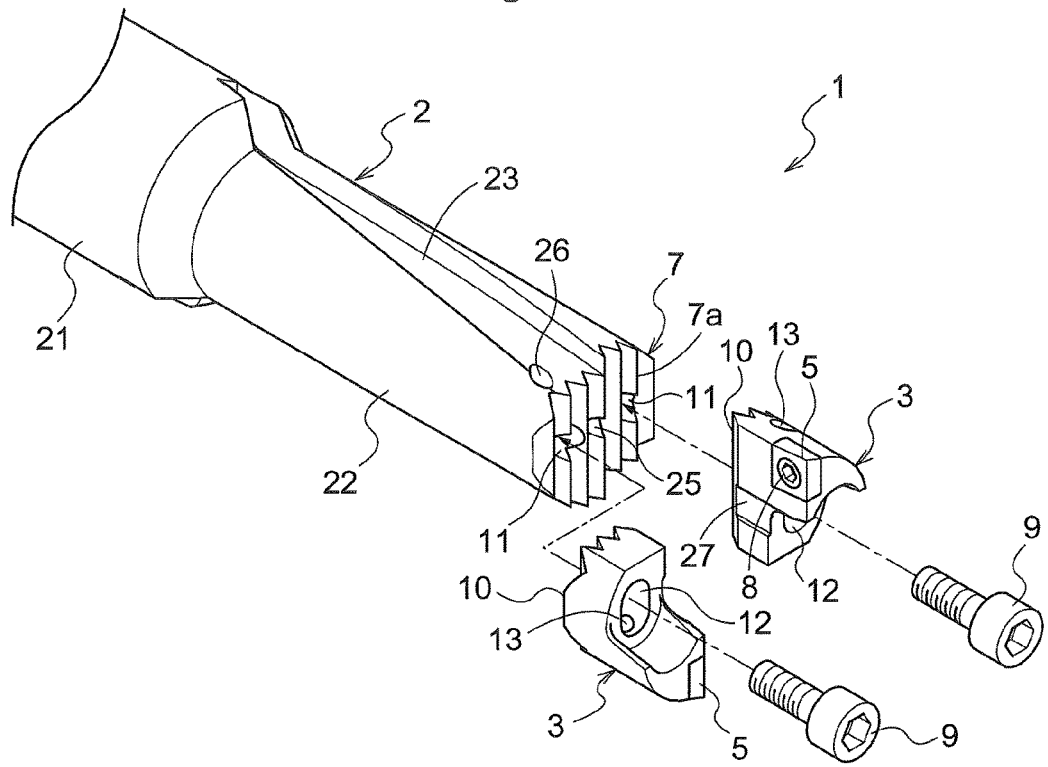
FIG. 1 is an exploded perspective view of a boring tool.
Figure 2:
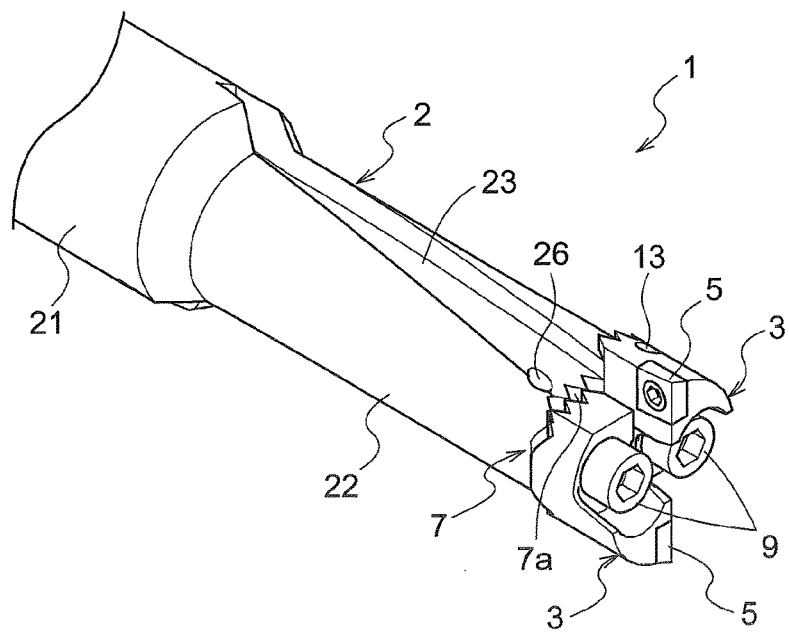
FIG. 2 is a perspective view of the boring tool.
Figure 3:
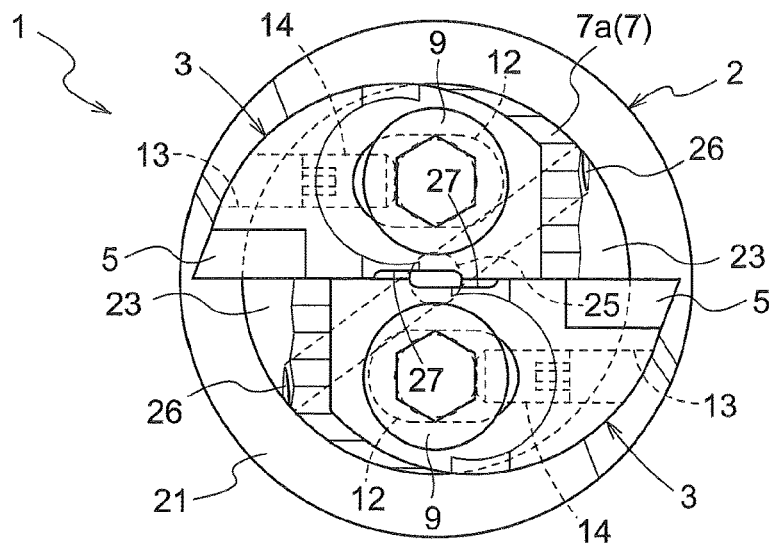
FIG. 3 is a front view of a leading end side of the boring tool.

FIGS. 1 through 3 show a boring tool 1 according to the present disclosure. The boring tool 1 includes a tool body 2 to be attached to a spindle (not shown) of a rotary machining tool and cartridges 3 each including a cutting blade 5. In the illustrated example, two cartridges 3 are mounted to a leading end face 7 of the tool body 2 with an offset of 180 degrees approximately. And, position adjustment in a radial direction is made possible. The cutting blade 5 is attached to the respective cartridge 3 with a fastener screw 8, so that the cutting blade 5 can be replaced.

Each cartridge 3 is mounted to the tool body 2 with a clamping screw 9. A serration work (a serration portion 7a) is provided in the entire leading end face 7. Whereas, projections and recesses machining corresponding to the serration portion 7a are provided in a mounting face 10 of the cartridge 3. The leading end face 7 defines two threaded holes 11 in which the clamping screws 9 are to be threadingly inserted. The clamping screw 9 is inserted into the threaded hole 11 via an oval slot 12 provided in the cartridge 3. With fastening of the clamping screw 9, each cartridge 3 can be position-adjusted in the radial direction within the range allowed by the oval slot 12.

Figure 6:
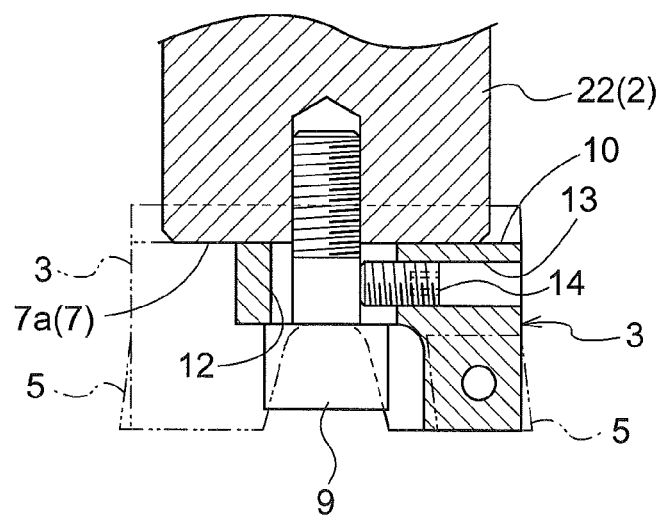
FIG. 6 is a partial section of the boring tool.

The cartridge 3 defines a through hole 13 in the radial direction from an outer wall portion along the outer circumference of the leading end face 7 toward the oval slot 12. As shown in FIG. 6, the through hole 13 is provided along the direction of the serration portion 7a of the leading end face 7 and an adjusting screw 14 is fitted within the through hole 13. This adjusting screw 14 is provided for adjustment of relative position between the clamping screw 9 and the cartridge 3 and can comprise e.g. a horosetto (a set screw). When e.g. the adjusting screw 14 is rotated clockwise from the outside of the through hole 13, the leading end portion of the adjusting screw 14 will be exposed toward the clamping screw 9 inserted through the through hole 13 into the oval slot 12, thus pressing the clamping screw 9. Namely, the adjusting screw 14 will be positioned between the clamping screw 9 and the inner circumferential face of the oval slot 12. With this, the cartridge 3 will move away from the clamping screw 9 and move radially outward along the serration portion 7a of the leading end face 7.

When the adjusting screw 14 is rotated counterclockwise for instance, the leading end portion of the adjusting screw 14 exposed from the through hole 13 will be retracted. In these manners, the radial position of the cartridge 3 can be changed by an operation on the adjusting screw 14.

The tool body 2 includes a shank portion 21 and a main body portion 22 continuous from the leading end side of the shank portion 21. Both the shank portion 21 and the main body portion 22 have cylindrical shape, with the main body portion 22 being smaller in diameter. In an outer circumference of the main body portion 22, there is formed a groove portion 23 continuous from the leading end side of the shank portion 21 toward the leading end face 7. The groove portion 23 has a flared shape allowing passage of cutting chips therethrough and tilted clockwise from the direction along the rotational axis, and the leading end side of the groove portion 23 (on the side of the leading end face 7) faces the downstream side of the cutting blade 5. The groove portion 23 promotes discharge of chips to the outside. By forming the groove portion 23 as deep as possible, discharge of chips from the groove portion 23 can be further promoted.

The tool body 2 includes, along the rotational axis direction, a coolant passage 24 for transporting coolant. As "a coolant discharge hole", a first discharge hole 25 is formed at the center of the leading end face 7 of the tool body 2 and a second discharge hole 26 is formed in the outer circumference of the main body portion 22 of the tool body 2. The second discharge hole 26 is defined in the groove portion 23 and provided at a position adjacent the leading end face 7. Both the first discharge hole 25 and the second discharge hole 26 are communicated to the coolant passage 24.

The first discharge hole 25 is disposed between the two cartridges 3 and is used for feeding the coolant toward the bottom of the bore of the workpiece. In the cartridge 3 and on an inner lateral side facing the first discharge hole 25, a recess is formed as a communication portion 27 for communicating the coolant discharged from the first discharge hole 25. The cartridge 3 will be adjusted in its position along the radial direction at the leading end face 7 of the tool body 2, in accordance with a diameter subjected to an inner face machining. To this end, the communication portion 27 (recess) is provided with a shape that allows communication of the coolant discharged from the first discharge hole 25, irrespective of the adjustable position of the cartridge 3. The second discharge hole 26 is provided one for each cartridge 3 and feeds the coolant toward the cutting edge.

The boring tool 1 includes an adjusting mechanism provided in the first discharge hole 25 and the second discharge hole 26 that allows adjustment of a discharge amount of the coolant therefrom respectively. More particularly as shown in FIG. 7, a female threaded portion 25a is formed in the inner face of the first discharge hole 25 and a female threaded portion 26a is formed in the inner face of the second discharge hole 26. The adjusting mechanism consists essentially of these female threaded portions 25a, 26a and screw members 28 threadable with these female threaded portions 25a, 26a. Each screw member 28 defines a through hole having a desired diameter. Then, with replacement among the screw members 28 having different through hole diameters, the discharge amount (flow amount and flow rate) of the coolant discharged from the first discharge hole 25 and the second discharge hole 26 can be adjusted easily. As a result, such adjustment is made possible which will increase the discharge amount of the coolant from the first discharge hole 25 with priority being placed on chips discharging or will increase the discharge amount of the coolant from the second discharge hole 26 with priority being placed on cutting edge cooling.

The adjusting mechanism (female threaded portions 25a, 26a and the screw members 28) can be configured to be able to block the discharging of the coolant from the first discharge hole 25 and the second discharge hole 26 independently of each other. By forming the above-described screw member 28 into a shape having no through hole, the discharge of the coolant from the first discharge hole 25 and the second discharge hole 26 can be blocked individually. With the above, even with such simple arrangement as above, it becomes readily possible to effect switchover, in accordance with a machining condition of the bore 30, a mode in which the coolant is fed to one of the cutting edge and the bottom portion 31 of the bore 30 and a further mode in which the coolant is fed to both the cutting edge and the bottom portion 31 of the bore 30.

Figure 4:
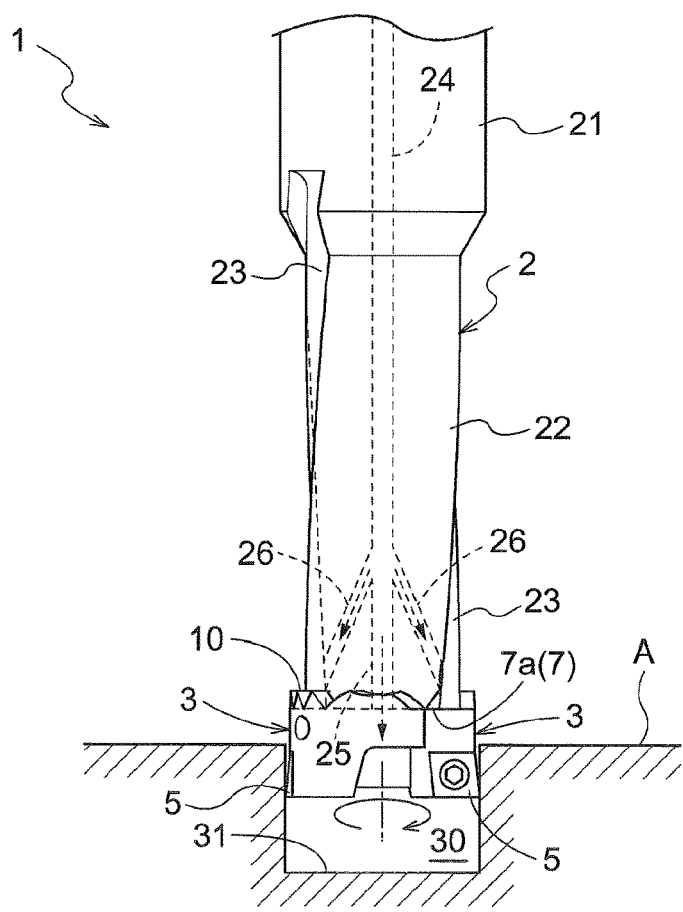
FIG. 4 is a view showing a state when an inner face machining is effected to a blind hole.
Figure 5:
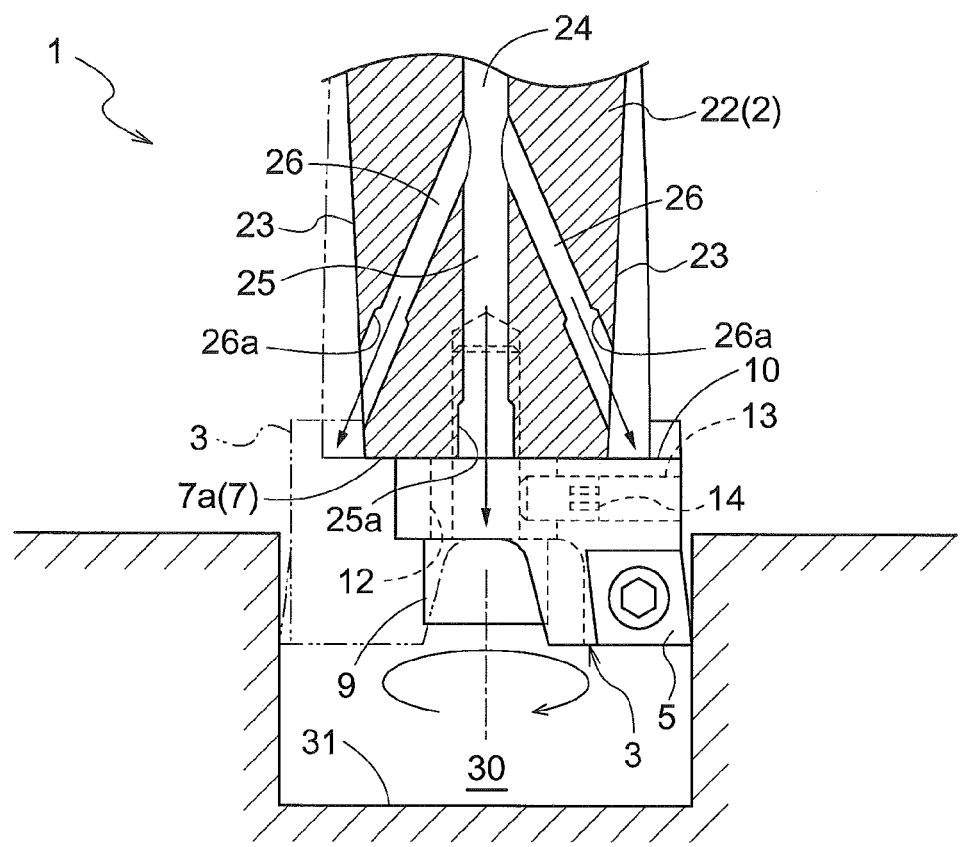
FIG. 5 is a partial section of the boring tool engaged in the inner face machining to the blind hole.

As shown in FIG. 4 and FIG. 5, in case an inner machining operation of a blind bore is to be effected with using the boring tool 1, the first discharge hole 25 and the second discharge holes 26 will be opened. With this, the coolant will be fed from the first discharge hole 25 toward the bottom portion 31 of the bore 30 of the workpiece A and also the coolant will be fed from the second discharge holes 26 toward the cutting edges of the blades 5. There will be generated a flow in which the coolant discharged from the first discharge hole 25 will be reflected by the bottom portion 31 of the bore 30 of the workpiece A and will then rise along the inner wall face of the bore 30 toward the opening. With this, cutting chips will be discharged from the circumference of the tool body 2 to the outside without being accumulated on the bottom portion 31. Further, the coolant fed from the second discharge holes 26 will cool the cutting blades 5, whereby adhesion of cutting chips to the blades 5 can be prevented also.

As shown in FIG. 7, at the time of inner face machining of a through hole, a screw member 28 having no through hole will be threaded into the female threaded portion 25a of the first discharge hole 25, thus blocking this first discharge hole 25. With this, the coolant will be discharged from the second discharge holes 26 only, so that the cutting edges of the cutting blades 5 will be cooled, thereby to suppress adhesion of chips to the blades 5 and to suppress wear of the cutting blades 5.

[Other Embodiments]

(1) The boring tool 1 according to the present disclosure can include a connecting shaft, instead of the shank portion 21.

(2) In the foregoing embodiment, there was shown a case in which the cartridge 3 defines a recess as the communication portion 27 for communicating the coolant discharged from the first discharge hole 25. Instead, the cartridge 3 can define a hole portion as the communication portion 27. And, such communication portion 27 can be provided in only selected one (or more) of the plurality of cartridges 3. Further, in case a discharge area for the first discharge hole 25 is secured (reserved) when the plurality of cartridges 3 are mounted, the cartridges 3 can omit the communicating portion 27.

(3) The boring tool 1 according to the present disclosure can be configured such that at the time of inner face machining of a blind hole, the second discharge holes 26 are blocked by the screw members 28 and the coolant is fed only by the first discharge hole in the rotational axis direction (FIG. 8).

(4) In the foregoing embodiment, there was shown a case in which the adjusting mechanism for adjusting discharge amounts of the coolant consists of the female threaded portions 25a, 26a and the screw members 28. However, the configuration of this adjusting mechanism is not particularly limited as long as the mechanism allows adjustment of the discharge amounts of the coolant from the first discharge hole 25 and the second discharge holes 26. Further, the adjusting mechanism can be configured such that a portion or entire first discharge hole 25 and second discharge holes 26 are covered by e.g. a cover body or the like.

REFERENCE SIGNS LIST

1: boring tool
2: tool body
3: cartridge
5: cutting blade
7: leading end face
9: clamping screw
12: oval slot
13: through hole
14: adjusting screw
21: shank portion
22: main body portion
24: coolant passage
25: first discharge hole
26: second discharge hole
27: communication portion
28: screw member
30: bore

The invention claimed is:

1. A boring tool comprising:
   a tool body to be attached to a spindle of a rotary machining tool; and
   a plurality of cartridges each attached to a leading end face of the tool body, having a cutting blade and being position-adjustable in a radial direction;
   wherein the tool body has a coolant passage for transporting coolant along a rotational axis direction;
   a discharge hole for the coolant communicates with the coolant passage and is comprised of a first discharge hole provided to be positioned between the plurality of cartridges in the leading end face; and
   at least one of the plurality of cartridges includes a communication portion which is a recess in an external surface of the respective cartridge along the rotational axis direction for communicating the coolant discharged from the first discharge hole, irrespective of an adjustable position of the cartridge.

2. A boring tool according to claim 1, comprising two cartridges mounted to the leading end face of the tool body with an offset of approximately 180°.

3. A boring tool according to claim 1, wherein the leading end face is constituted by a serrated portion, and the cartridges each comprise complementary projections and recesses to serrations in the leading end face.

4. A boring tool according to claim 3, wherein the leading end face comprises two threaded holes and each cartridge comprises an oval slot, such that a clamping screw is insertable through each said oval slot and screwable into a respective threaded hole, and each said cartridge is thereby postion-adjustable in the radial direction with a range permitted by the respective oval slot.

5. A boring tool according to claim 4, wherein in each cartridge additionally comprises a through hole extending towards the oval slot and positioned to extend along the direction of the serrated portion of the leading end face, and receive an adjusting screw which abuts the clamping screw when received therein, such that each said cartridge is radially adjustable along the serrated portion of the leading end face.

6. A boring tool according to claim 1, wherein the tool body comprises a groove portion extending towards the leading end face and flared in the direction of the leading end face.

7. A boring tool comprising:
a tool body to be attached to a spindle of a rotary machining tool; and
a plurality of cartridges each attached to a leading end face of the tool body, having a cutting blade and being position-adjustable in a radial direction;
wherein the tool body has a coolant passage for transporting coolant along a rotational axis direction;
a discharge hole for the coolant communicates with the coolant passage and is comprised of a first discharge hole provided to be positioned between the plurality of cartridges in the leading end face and a second discharge hole provided in an outer circumference of the tool body and directed toward a cutting edge of the cutting blade;
the first discharge hole and the second discharge hole are provided respectively with an adjusting mechanism for adjusting a respective coolant discharge amount of the first discharge hole and the second discharge hole; and
at least one of the plurality of cartridges includes a communication portion which is a recess in an external surface of the respective cartridge along the rotational axis direction for communicating the coolant discharged from the first discharge hole, irrespective of an adjustable position of the cartridge.

8. A boring tool according to claim 7, comprising two cartridges mounted to the leading end face of the tool body with an offset of approximately 180°.

9. A boring tool according to claim 7, wherein the leading end face is constituted by a serrated portion, and the cartridges each comprise complementary projections and recesses to serrations in the leading end face.

10. A boring tool according to claim 9, wherein the leading end face comprises two threaded holes and each cartridge comprises an oval slot, such that a clamping screw is insertable through each said oval slot and screwable into a respective threaded hole, and each said cartridge is thereby postion-adjustable in the radial direction with a range permitted by the respective oval slot.

11. A boring tool according to claim 10, wherein in each cartridge additionally comprises a through hole extending towards the oval slot and positioned to extend along the direction of the serrated portion of the leading end face, and receive an adjusting screw which abuts the clamping screw when received therein, such that each said cartridge is radially adjustable along the serrated portion of the leading end face.

12. A boring tool according to claim 7, wherein the tool body comprises a groove portion extending towards the leading end face and flared in the direction of the leading end face, and with the second discharge hole defined in the groove portion and positioned adjacent the leading end face.

13. The boring tool according to claim 7, wherein the tool body comprises a plurality of second discharge holes each angled outwardly from the coolant passage and first discharge hole, and
the adjusting mechanism is constituted by female threaded portions at the respective outlets of the first and second discharge holes and each arranged to receive a screw member having a respective orifice therethrough or no orifice therethrough.

* * * * *